(No Model.) 2 Sheets—Sheet 1.
E. B. BADLAM.
CABLE RAILWAY CROSSING AND CURVE.
No. 371,660. Patented Oct. 18, 1887.
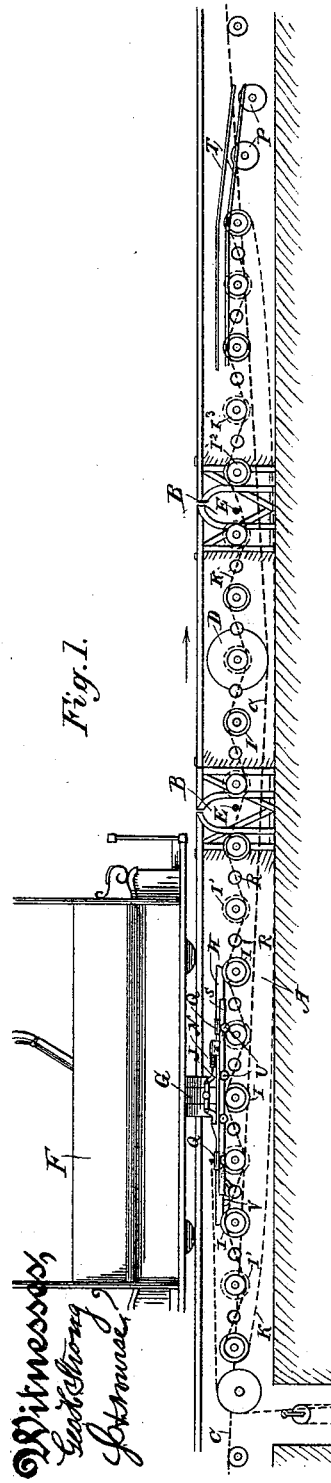
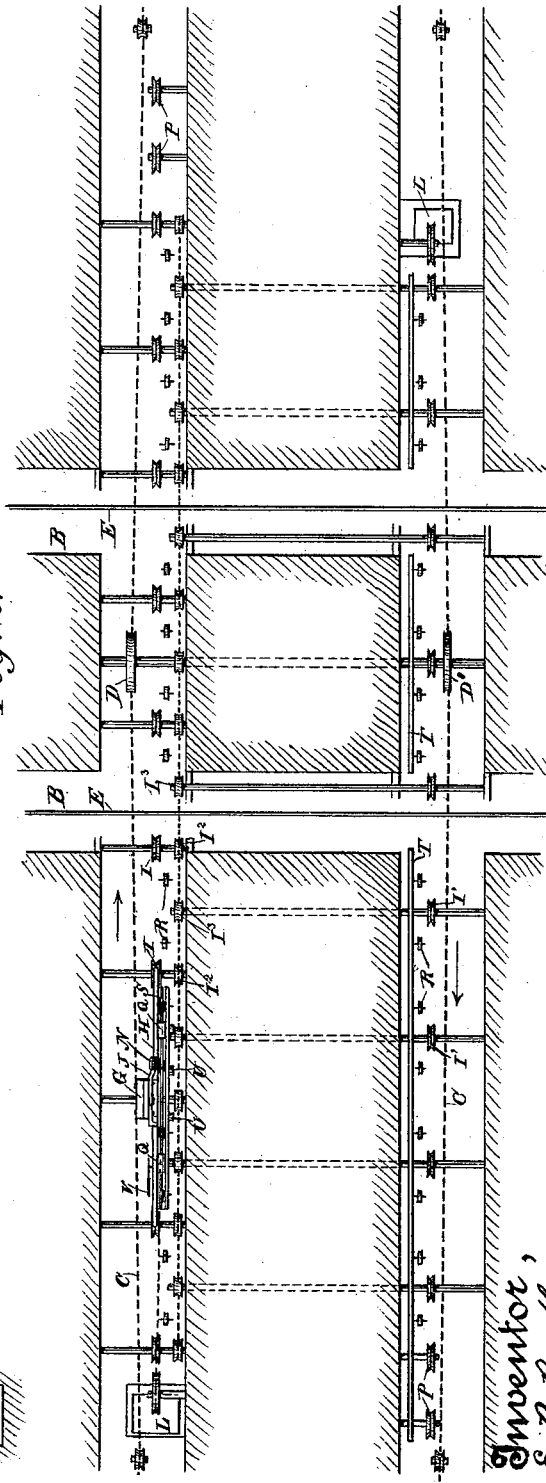

(No Model.) 2 Sheets—Sheet 2.
E. B. BADLAM.
CABLE RAILWAY CROSSING AND CURVE.
No. 371,660. Patented Oct. 18, 1887.
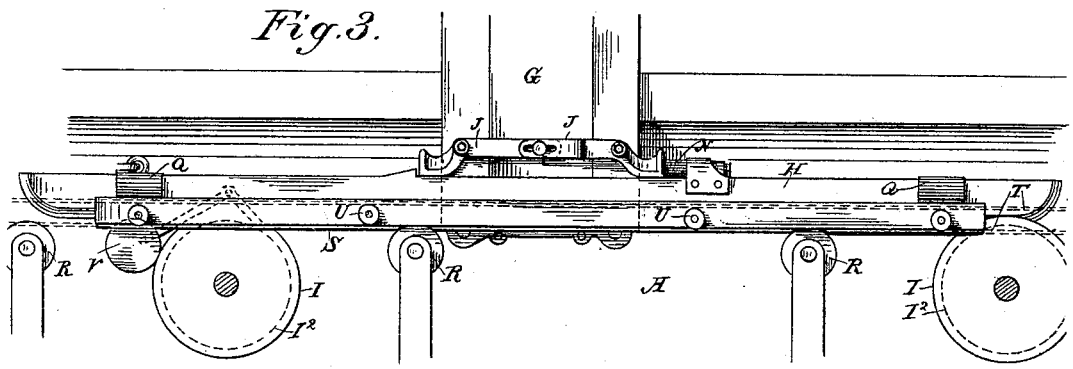
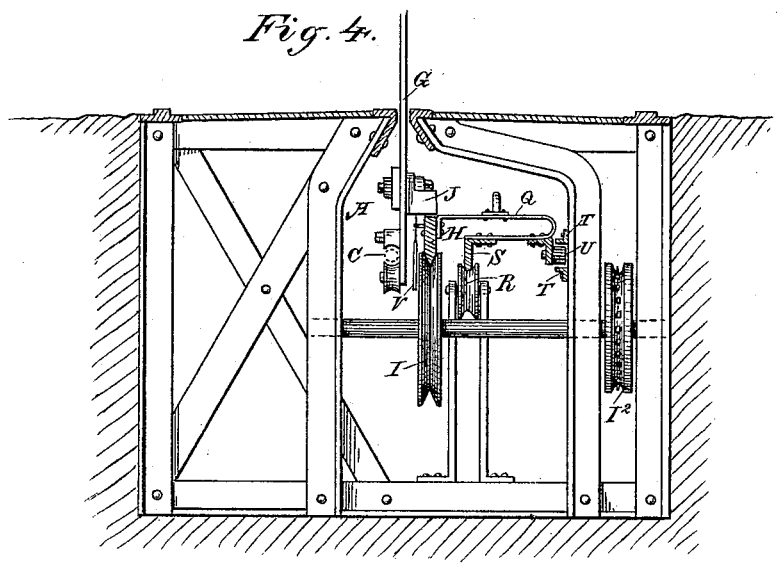
Witnesses,
Geo. H. Strong
J. H. Towne
Inventor,
E. B. Badlam
By Dewey & Co.
attys

UNITED STATES PATENT OFFICE.

EDGAR B. BADLAM, OF SAN FRANCISCO, CALIFORNIA.

CABLE-RAILWAY CROSSING AND CURVE.

SPECIFICATION forming part of Letters Patent No. 371,660, dated October 18, 1887.

Application filed May 14, 1887. Serial No. 238,279. (No model.)

*To all whom it may concern:*

Be it known that I, EDGAR B. BADLAM, of the city and county of San Francisco, State of California, have invented an Improvement in Cable-Railway Crossings and Curves; and I hereby declare the following to be a full, clear, and exact description of the same.

My invention relates to a device for transferring cars of one cable-railway line across a similar line the cables of which run above the first-mentioned one.

It consists of a traveling carriage which moves a short distance to either side of the crossing lines, a supplemental cable or chain by which it is driven, and which receives its motion by connection with the main cable, or by other suitable means, and means for connecting the carriage with the car to be transferred, means for returning the carriage to its original position after its duty is performed, and certain details of construction, which will more fully explained by referring to the accompanying drawings.

Figure 1 is a vertical section through a portion of the cable-railway channel, showing my improvement. Fig. 2 is a plan view. Fig. 3 is an enlarged side elevation of the traversing bar. Fig. 4 is an enlarged end view of the device and cross-section of the cable-channel.

A represents a line of cable railway; B, the two crossing lines, the cables of which travel above the cables C of the first-mentioned line. The cable C is carried below these upper cables by a depression-pulley, D, so as to be entirely clear of the cables E of the cross-line. The depression-pulley D' of the return-cable turns loosely upon the shaft.

F represents a car or dummy traveling upon the line A, and having the usual grip mechanism, G, by which the rope is grasped for the purpose of propelling the car under ordinary conditions. When, however, the point of crossing is reached, the cable is dropped from the grip, and at this point is an elongated traveling bar or carriage, H, which is suitably supported above and slightly out of contact with the grooved or V-shaped rollers I, and is propelled by them, as will be hereinafter described.

Spring-arms Q are bolted to the frame-work of the carriage, and their inner ends connect with the traversing bar H, so that when the pressure of the grip-lever is taken from the bar the springs will raise it out of contact with the grooved pulleys I, by which it was carried across. The frame and traversing bar are then supported upon the loosely-journaled rollers R by means of a second bar, S, which rests upon these rollers and travels upon them as the weight draws the device back to the point of starting.

T T are guide-flanges shown in Figs. 2 and 4 and partially at the right end of Fig. 1. Rollers U are journaled upon the frame and travel in this guide, thus keeping the traversing bar in the proper position during its movements.

In order to indicate the position of the bar and frame, I have constructed an arm carrying a flag or disk, V, which is turned up through the cable-railway slot after the car leaves the carriage, and as the carriage travels back this disk stays where it is. After it reaches its first position a lug acts to turn the arm about its hinge or pivot and causes it to lie down again.

The grip is released from the cable and then engages this bar, and the bar is caused to move by rolling contact with the rollers I I'. These rollers extend from about the point where the main cable begins to depress beneath the crossing lines B to a point sufficiently distant upon the opposite side of said line, and they are propelled by means of a supplemental cable or chain, K, which passes around other pulleys upon the same shafts, and which is driven by power derived from the main depression-pulley D, before described, or other suitable means. As the cars upon one track must pass in one direction while the cars upon the track parallel to it move in the opposite direction, the pulleys I are driven by the pulleys I², fixed to the same shafts, the rope K passing above the pulleys. The shafts of the return-pulleys I' extend across into the same channel and carry the pulleys I³. The supplemental cable K passes alternately above the pulleys I² and beneath the pulleys I³, thus alternately passing above one pulley and below another throughout the whole of its travel. The result of this will be to drive the pulleys I in one cable-channel in one direction, which will act to transmit the traveling carriage in the proper direction and carry the car across the intersecting line, while the pulleys I' in the channel of the return-cable will have their movements reversed by the above-described action, and they will thus drive the corresponding pulleys I' in the return-cable tube in the opposite direction, so as to move the carriage upon that side in a direction opposite to the one upon the right side. The whole mechanism is thus driven directly from the supplemental cable in one channel.

The operation will then be as follows: The car having arrived at the point where it drops the main rope by throwing the lever back preparatory to crossing the intersecting line, the main cable is dropped, and the engaging lever J will strike the stops with elastic buffers N upon the traversing bar or carriage H. The hand-lever, being then thrown forward, will force the traversing bar down into contact with the sharp grooved pulleys I, so that their movement will carry or roll it across the transverse lines and drag with it the car, the grip of which travels above the level of the transverse ropes or cables. These cables pass between the sets of pulleys I, as shown. At the proper point beyond the intersecting line the traveling bar or carriage passes down a slight incline, P, and thus relieves the grip, which then passes on above the stop N, and may be connected with the main cable and continue the journey. In order to return this traversing bar or carriage to its original position, I employ a weight, L, with multiplying-pulleys, and a rope or chain connecting with the traveling bar, so that as soon as the latter is released from the car the weight will act to bring the bar back to its original position.

Having thus described my invention, what I claim as new, and desire to secure by Letters Patent, is—

1. A mechanism for transferring cable-railway cars across an intersecting cable-line, consisting of an elongated traveling bar or carriage, pulleys or rollers by which it is driven by frictional contact, and a grip or connection by which the car upon the track may be connected with this bar or carriage, substantially as described.

2. A device for transferring cable-railway cars across similar intersecting lines, consisting of a traveling bar or carriage, with which the car may be connected, pulleys, rollers having frictional surfaces with which the carriage is brought into contact, and a supplemental endless chain or cable deriving power from the movement of the main cable, so as to rotate the rollers, substantially as described.

3. A device for transferring cable-railway cars across an intersecting line, consisting of a traveling bar or carriage, with which the grip of the car may be connected temporarily, the series of rollers upon which the carriage travels and into which it is brought into frictional contact for the purpose, in combination with a short supplemental endless chain or cable passing around pulleys upon the roller-shafts and deriving its power from the main cable, and a return-weight and connecting-ropes, substantially as described.

4. The supplemental endless chain or cable deriving its power from the main cable, in combination with a series of shafts having driving-pulleys, every alternate shaft extending into the opposite cable tube or tunnel, and so that the supplemental cable, passing above and below alternate pulleys, will cause the shafts to rotate in opposite directions, whereby one set of pulleys will transfer the car in one direction, while the other set of pulleys act to transfer it in the opposite direction upon the other track, substantially as described.

5. The traversing bar or carriage having the projection or buffer N, and the rollers upon which the bar travels, in combination with the grip and lever J, attached to the car, and by which the bar is forced into contact with the rollers, so as to be propelled by them, substantially as herein described.

6. The traversing bar and buffer and the rollers by which it is driven, in combination with a second bar and supplemental rollers upon which the device is returned, and springs by which the traversing bar is raised out of contact with the driving-rollers when it is relieved of pressure, substantialy as described.

7. The traversing bar or carriage and buffer, the rollers by which it is driven, the second bar and supplemental rollers, and return-weight, in combination with the guide rollers and channel, substantially as herein described.

8. In combination with the traversing bar, propelling and return rollers, and grip mechanism of a cable railway, the guide-rollers attached to the bar and the fixed guide-channel in which they travel, said channel lying parallel with the rails to a point beyond the intersecting line and having the end depressed, so as to carry the bar below and release it from the grip, substantially as herein described.

In witness whereof I have hereunto set my hand.

EDGAR B. BADLAM.

Witnesses:
CHAS. E. KELLY,
E. DANGLADA.